United States Patent [19]

Klabunde

[11] Patent Number: 5,030,606

[45] Date of Patent: Jul. 9, 1991

[54] NICKEL-CATALYZED COPOLYMERIZATION OF ETHYLENE

[75] Inventor: Ulrich Klabunde, West Chester, Pa.

[73] Assignee: E. I. Du Pont de Nemours and Company, Wilmington, Del.

[21] Appl. No.: 443,548

[22] Filed: Nov. 30, 1989

Related U.S. Application Data

[62] Division of Ser. No. 91,951, Sep. 1, 1987, Pat. No. 4,906,754, which is a division of Ser. No. 787,148, Oct. 15, 1985, Pat. No. 4,698,403.

[51] Int. Cl.$^5$ .................................. C08F 4/26
[52] U.S. Cl. ..................... 502/155; 502/117; 502/152; 502/153; 502/154; 502/158; 502/160; 502/162; 502/164; 502/167; 502/168; 502/171
[58] Field of Search ............. 502/117, 152, 153, 154, 502/155, 162, 164, 167, 168, 171, 158, 160

[56] References Cited

U.S. PATENT DOCUMENTS

| | | | |
|---|---|---|---|
| 2,691,647 | 10/1954 | Field et al. | 526/348 |
| 3,073,809 | 1/1963 | Kluiber et al. | 526/348 |
| 3,300,463 | 1/1967 | De La More | 526/348 |
| 3,686,159 | 8/1972 | Bauer et al. | 502/155 X |
| 4,097,509 | 6/1978 | Schmidbaur | 502/155 X |
| 4,293,502 | 10/1981 | Beach et al. | 502/154 X |
| 4,293,727 | 10/1981 | Beach et al. | 585/526 |
| 4,529,554 | 7/1985 | Beach et al. | 502/155 |
| 4,537,982 | 8/1985 | Starzewski et al. | 556/22 |
| 4,567,173 | 1/1986 | Sundelin | 546/2 |
| 4,590,288 | 5/1986 | Kleeman | 546/2 |
| 4,686,315 | 8/1987 | Beach et al. | 502/117 X |
| 4,689,437 | 8/1987 | Murray | 502/117 X |
| 4,725,568 | 2/1988 | Parker et al. | 546/2 |

FOREIGN PATENT DOCUMENTS 3228865 8/1982 Fed. Rep. of Germany .
1578584 11/1980 United Kingdom .

OTHER PUBLICATIONS

J. Boor, "Ziegler-Natta Catalysts and Polgmerizations", Chaps. 19, 20, Acad. Press (1979).
W. Keim et al., Angew. Chem. Int. Ed. Engl-: (1) 17, No. 6, 466, (1978): and.
W. Keim et al., Angew. Chem. Int. Ed. End-: (6) 22, No. 6, 503, (1983).
W. Keim. Ann. N.Y. Acad, Sci., 415, 191 (1983).
Kem I, Chem Abs 89, 43742y (1978).
Kem II, Chem Abs 93, 7580t (1978).

*Primary Examiner*—Patrick P. Garvin

[57] ABSTRACT

Preparation of ethylene copolymers from ethylene and polar and/or non-polar comonomers in the presence of selected nickel-containing catalysts.

4 Claims, No Drawings

NICKEL-CATALYZED COPOLYMERIZATION OF ETHYLENE

This is a division of application Ser. No. 091,951 filed Sept. 1, 1987 and now U.S. Pat. No. 4,906,754, which is a divisional application of Ser. No. 787,148, filed Oct. 15, 1985, and now U.S. Pat. No. 4,698,403.

BACKGROUND OF THE INVENTION

1. Technical Field

This invention relates to the preparation of ethylene/1-olefin copolymers in the presence of selected nickel-containing catalysts.

2. Background

Various nickel-containing compounds, usually in complexed form, are known in the art as catalysts for polymerizing ethylene to linear 1-olefin oligomers. Certain of these catalysts, under selected conditions, are reported to polymerize ethylene to high molecular weight polyethylene. The copolymerization of ethylene with polar or non-polar 1-olefins, catalyzed by nickel-containing compounds, is unknown in the art.

Also well known in the art are copolymers of ethylene and non-polar or polar 1-olefin comonomers, prepared with nickel-free catalysts, such as the organometallic Ziegler-Natta coordination-type catalysts and free-radical catalysts. The most commonly used polar 1-olefins are of the formula $CH_2=C(R)X$ wherein R is H or $CH_3$ and X is a polar group, such as $OC(O)CH_3$, $OR'$ or $CO_2R$, wherein $R'$ is alkyl, cylcoalkyl, aryl or halogen. Copolymers of ethylene and 1-olefinic comonomers containing polar functions attached other than to the vinyl group are also known, such comonomers being of the formula $CH_2=CH(CH_2)_nX$ wherein X is a polar group and n is an integer and is at least one, or of the formula $CH_2=CHX(Z)_n$ wherein X is a hydrocarbon group having at least one carbon atom, Z is a polar group and n is at least one.

The difficulty of copolymerizing polar 1-olefin comonomers with ethylene using coordination-type catalysts, as compared to non-polar 1-olefins, is known to be greatest when the polar group is close to the vinyl group; it is also known to become easier the more closely the polar comonomer resembles a non-polar comonomer. Rules for achieving this similarity by various types of shielding are known in the art.

It has been discovered that certain, selected nickel-based catalysts which are known for use in the preparation of ethylene oligomers and, in some cases, polyethylene, are useful for preparing ethylene/1-olefin copolymers, including those containing polar substituents. Also discovered and disclosed herein are novel nickel-containing catalysts which are similarly useful.

SUMMARY OF THE INVENTION

This invention provides: (1) a process for copolymerizing ethylene with 1-olefins in the presence of selected nickel-containing catalysts, (2) novel nickel-containing catalyst compositions and (3) processes for catalyst preparation.

The invention herein resides in the copolymerization process comprising contacting and reacting ethylene, in an oxygen-free atmosphere, at a temperature in the range of about 0° C. to about 200° C., in the presence of a selected nickel-containing catalyst, with one or more 1-olefins of the formula $CH_2=CHX$ wherein:

X is $-R$, $-OR$, $-R_HR_F$, $-OR_F-Si(OR^1)_{3-x}R^1)_x$, $-OSi(OR^1)_{3-x}R^1)_x$, $-N(R')(R^2)$, $-Sn(R^1)_3$ and $-B(R^1)_2$;

R is hydrocarbyl, provided, however: (i) conjugated aliphatic unsaturation and terminal $-C\equiv CH$ groups are excluded, and any unsaturation is separated from the enyl group $CH_2=CH-$ by at least one carbon atom; and (ii) any functional substituent selected from $-OH$, $-CO_2R^2$, $-CO_2Si(OR^1)_{3-x}(R^1)_x$, $-C(O)N(R^1)_2$, $-N(CH_3)_2$, $-SOR^2$, $-SO_2R^2$ or $-OSO_2R^2$ is separated from the enyl group $CH_2=CH$ by at least two carbon atoms;

$R_H$ is $C_{1-20}$ hydrocarbylene;

$R_F$ is $C_{1-20}$ perfluorocarbyl, optionally containing in-chain ether oxygen;

$R'$ is $C_{2-10}$ hydrocarbyl;

x is 0 or an integer of 1 to 3;

each $R^1$, independently, is H or $C_{1-20}$ hydrocarbyl; and $R^2$ is $C_{1-20}$ hydrocarbyl.

The nickel-containing catalysts used in the process of this invention consist essentially of one or more of the following:

1(a) The dinickel compound of the formula

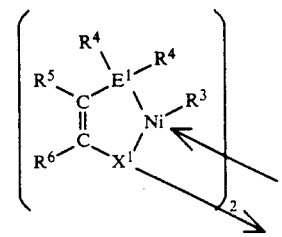

wherein:

$R^3$ and each $R^4$, independently, is H or $C_{1-20}$ hydrocarbyl;

$X^1$ is O or S;

$E^1$ is P, As or Sb; and each of $R^5$ and $R^6$, independently, is H, $C_{1-20}$ hydrocarbyl or a functional group selected from $-OR^2$, $-Cl$, $-CO_2R^2$, $-CO_2M$, $-C(O)N(R^1)_2$, $-C(O)R^2$, $-SR^2$, $-SO_2R^2$, $-SOR^2$, $-OSO_2R^2$, $-P(O)(OR^2)_{2-y}(R^1)_y$, $-CN$, $-NHR^2$, $-N(R^2)_2$,

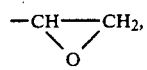

$-Si(OR^1)_{3-x}(R^1)_x$, $-OSi(OR^1)_{3-x}(R^1)_x$, $-NO_2$, $-SO_3M$, $-PO_3M_2$ and $-P(O)(OR^2)_2M$ wherein M is alkali or alkaline earth metal, ammonium, quaternary ammonium, phosphonium or arsonium, y is 0, 1 or 2 and $R^1$, each $R^2$, independently, and x are as defined above, or $R^5$ and $R^6$, taken together, is a substituted or unsubstituted $C_{5-8}$ alicyclic, $C_{5-8}$ heterocyclic or $C_{6-14}$ aromatic ring, the heteroatom of the heterocyclic ring being selected from O, N and S;

1(b) the nickel compound of the formula

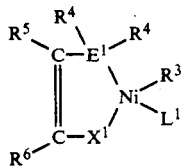

wherein:

$R^3$, $R^4$, $R^5$, $R^6$, $X^1$ and $E^1$ are defined as above and $L^1$ is a weakly coordinating ligand, or $R^3$ and $L^1$ taken together is

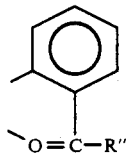

wherein R" is H, $C_{1-20}$ hydrocarbyl or oxyhydrocarbyl or $N(R^2)_2$ wherein each $R^2$, independently, is $C_{1-20}$ hydrocarbyl;

1(c) the nickel-containing compound of the formula

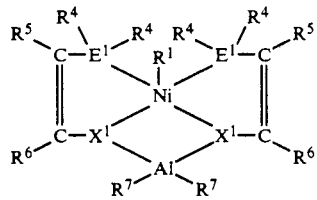

wherein:

$R^1$, $R^4$, $R^5$, $R^6$, $X^1$ and $E^1$ are defined as above;

each $R^7$, independently, is H, $-OSi(R''')_3$, $C_{1-20}$ alkyl or oxyalkyl, $C_{6-20}$ aryl, alkaryl, aralkyl or oxyaryl, $N(R^2)_2$ wherein $R^2$ is as defined above, or halogen, or both $R^7$ groups, taken together, is a 5 to 8-membered heterocyclic ring wherein the heteroatom is selected from O, N and S; and each $R'''$, independently, is $C_{1-20}$ alkyl or oxyalkyl, $C_{6-20}$ aryl, alkaryl, aralkyl or oxyaryl;

(2) the mixture comprising:
(i) the nickel compound of the formula

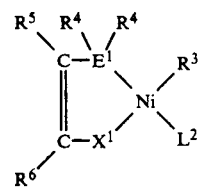

wherein:

$R^3$, $R^4$, $R^5$, $R^6$, $X^1$ and $E^1$ are defined as above and $L^2$ is a strongly coordinating ligand; and (ii) an acceptor compound which can react irreversibly with $L^2$;

(3) the mixture comprising:
(i) the nickel compound of the formula

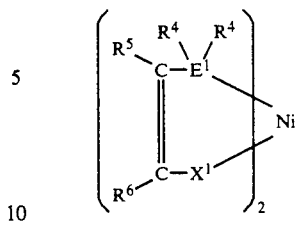

$R^4$, $R^5$, $R^6$, $X^1$ and $E^1$ are defined as above; and (ii) a suitable alkylating or arylating compound; and (4) the mixture as described in U.S. Pat. No. 3,686,159 and comprising:
(i) one or more zero-valent olefin-nickel compounds or x-allyl nickel compounds, or a nickel(I) or nickel(II) compound capable of forming said compounds in the presence of a reducing agent; and
(ii) the phosphorane of the formula $$(R^4)_3P=C(R^5)-C(O)R^6$$

wherein $R^4$, $R^5$ and $R^6$ are defined as above, with the proviso that at least one $R^4$ is aryl or substituted Preferably, the nickel compound (4)(i) is bis(1,5-cyclooctadiene)nickel(0).

DETAILED DESCRIPTION OF THE INVENTION

By "functional substituents" is meant polar radicals which are unreactive under polymerizing conditions. Functional substituents include but are not limited to $-OH$, $OR^2$, $-Cl$, $-CO_2R^2$, $-CO_2M$, $-C(O)N(R^1)_2$, $-C(O)R^2$, $-SR^2$, $-SO_2R^2$, $-SO_2R^2$, $-OSO_2R^2$, $-P(O)(OR^2)_{2-y}(R^1)_y$, $-CN$, $-NHR^2$, $-N(R^2)_2$,

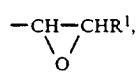

$-CF_3$, $-Si(OR^1)_{3-x}(R^1)_x$, $-OSi(OR^1)_{3-x}(R^1)_x$, $-NO_2$, $-SO_3M$, $-PO_3M_2$, $-P(O)(OR^2)_2M$, $-CO_2$-$Si(OR^1)_{3-x}(R^1)_x$ and $-P(R^1)_2Cr(CO)_5$ wherein M is alkali metal, ammonium or quaternary ammonium and $R^1$, $R^2$, x and y are as defined above.

The term "in-chain" (heteroatom) is intended to include both the main (backbone) chain and any side chain. Preferred in-chain heteroatoms are $-O-$,

and $-S-$.

By hydrocarbyl is meant an aliphatic, alicyclic, aromatic or mixed aliphatic-aromatic monovalent radical, optionally containing one or more functional substituents and/or one or more in-chain heteroatoms which are inert under polymerizing conditions.

By hydrocarbylene is meant a divalent radical which is otherwise defined as for hydrocarbyl.

By weakly coordinating ligand ($L^1$) is meant a compound which can bond to nickel, but is readily displaced therefrom by the olefin which is being polymerized. Weakly coordinating ligands ($L^1$) include but are not limited to pyridine, piperidine, alkyl ethers, tetrahydrofuran, alkyl and aryl nitriles and dinitriles, alcohols, amides, aliphatic esters and tertiary amines.

By strongly coordinating ligand ($L^2$) is meant a compound which can bond to nickel sufficiently strongly to displace therefrom part or all of the olefin which is being polymerized. Strongly coordinating ligands ($L^2$) include but are not limited to compounds of the formula $E^1(R^1)_3$ wherein $E^1$ and $R^1$ are defined as above.

By acceptor compound is meant a compound which bonds to (complexes) a ligand more strongly than does nickel. Acceptor compounds include but are not limited to organic oxidants, such as amine oxides, peroxides and hydroperoxides, alkylating compounds and Group VIII metal complexes. Specific examples are trimethylamine oxide, di-t-butylperoxide, cyclohexylhydroperoxide, methyl iodide, trimethylsilyl iodide, bis(benzonitrile)-palladium dichloride, bis(1,5-cyclooctadiene)nickel(0), nickel tetracarbonyl, 2,4-pentanedionatobis-(ethylene)rhodium(I) and ethylene pentacarbonylchromium(0).

By alkylating or arylating compound is meant a compound which is capable of chemically transferring alkyl or aryl groups, as the case may be, to nickel. Alkylating and arylating compounds include but are not limited to alkyl and aryl iodides, aluminum alkyls and aryls, transition metal alkyl- and aryl-containing compounds, such as dimethyl(1,5-cyclooctadiene)platinum(II) and dimethylbis(phosphine)nickel, and other conventional reagents capable of transferring alkyl and/or aryl radicals.

In catalyst mixture (2), the acceptor compound (2)(ii) is present in the amount of about 0.1 to >1 mole, preferably about 0.5 to about 2 moles, per mole of nickel compound (2)(i).

In catalyst mixture (3), the alkylating or arylating compound (3)(ii) is present in the amount of about 0.01 to about 2 moles, preferably about 0.1 to about 1.5 moles, per mole of nickel compound 3(i).

In catalyst mixture (4), the molar ratio of the nickel compound to the phosphorane can vary from about 1:1 to about 1:10, preferably about 1:1 to about 1:3.

The catalyst components (i) and (ii) in mixtures (2), (3) and (4) can be introduced to the polymerization reactor together or separately as solids or in solution and/or together with the comonomer and/or the solvent. The presence of comonomer during addition of the catalyst components in (4) may stabilize the nickel(0) species or its precursor by directly complexing to the nickel.

Catalyst 1(a) is produced when mixture (2) is subjected to polymerizing conditions in the absence of ethylene and/or comonomer. More specifically, catalyst 1(a) can be prepared by heating mixture (2) in a solvent at a temperature of about 0° C. to about 150° C., preferably about 20° C. to about 60° C., and at any suitable pressure, preferably atmospheric pressure, for about 1 minute to about 48 h. Preferred solvents are aromatic solvents, such as benzene, toluene and xylene. The reaction mixture can be cooled to below room temperature to facilitate precipitation or crystallization of the catalyst 1(a).

Catalyst 1(b) is prepared by contacting and reacting catalyst mixture (4) with an excess of the weakly coordinating ligand $L^1$, defined as above. $L^1$ may also serve as a solvent for the reaction. Specifically, mixture (4) and ligand $L^1$ are mixed in the molar proportion of $\geq 1$ mole of $L^1$ per mole of catalyst component 4(i), preferably about 10 to about 1000 moles of $L^1$ per mole of 4(i), in a suitable solvent, and reacted at a temperature of about 0° C. to about 150° C. preferably about 20° C. to about 60° C., for about one minute to about 72 h, at any suitable pressure, preferably atmospheric pressure.

The catalyst 1(b) is isolated by conventional techniques, such as by filtration or, if dissolved, by precipitation with a non-solvent or by solvent evaporation. Suitable solvents include aromatic compounds, such as benzene or toluene; alcohols, such as ethanol or isopropanol; ethers, such as tetrahydrofuran or diethylether; nitriles, such as acetonitrile or benzonitrile; ketones, such as acetone or methylphenylketone; amides, such as acetamide or dimethylformamide; esters, such as ethyl acetate or methyl benzoate; and dimethylsulfoxide. Aromatic hydrocarbons, such as toluene or benzene, are preferred. Halogen-containing solvents, such as chloroform, methyl iodide or bromobenzene, should be avoided because of possible reaction with the nickel-containing compounds.

It will be understood that catalyst 1(b) is similar in structure to catalyst component 2(i) except that the strongly coordinating ligand $L^2$ is replaced with the weakly coordinating ligand $L^1$.

Catalyst 1(c) is prepared by heating the catalyst mixture (3), wherein the alkylating or arylating agent 3(ii) is an aluminum compound, in a suitable solvent, such as benzene or toluene, at a temperature of about $-25°$ C. to about 120° C., preferably at about 0° C. to about 60° C., for about 1 minute to about 60 minutes. Catalyst 1(c) can be isolated as described above for catalyst 1(b).

The nickel-containing catalyst component 2(i) is a known compound; its preparation is described in U.S. Pat. Pat. 4,293,502.

The nickel containin9 catalyst component 3(i) wherein $X^1$ is O can be prepared:

(a) by the procedure descibed by Moulton and Shaw in J. Chem. Soc. Dalton, 300 (1980);

(b) by reacting the corresponding ylid, bis(1,5-cyclooctadiene)nickel, with an approximately 10 to 100 molar excess of methyl methacrylate in an aromatic solvent, such as toluene or benzene, at a temperature of about 20° C. to about 100° C.;

(c) by reacting either catalyst 1(a), catalyst component 2(i) or catalyst 1(b) with a $\beta$-ketophosphine of the formula $(R^4)_2PCH(R^5)C(O)R^6$, wherein $R^4$, $R^5$ and $R^6$ are defined as above, in an aromatic solvent, such as toluene or benzene, at a temperature of about 20° C. to about 120° C., for about 1 are mixed in the molar are mixed in the molar minute to about 48 h;

(d) by reacting, in the presence of a strong alkali, such as sodium hydroxide or potassium ethoxide, in a suitable solvent, such as toluene, benzene, tetrahydrofuran (THF) or ether, at a temperature in the range of about $-10°$ C. to about 100° C., the aforesaid $\beta$-ketophosphine and the nickel compound of the formula $(R^8)_2Ni(L^3)_2$ or $(X^2)_pNi(L^3)_m$ wherein:

each $R^8$, independently, is $C_{1-20}$ alkyl or alkoxy or $C_{6-20}$ aryl or aryloxy, preferably methyl, methoxy, phenyl or phenoxy;

each $L^3$, independently, is a monodentate ligand, such as $E^1(R^1)$ wherein $R^1$ and $E^1$ are defined as above, or two $L^3$ groups taken together are a bidentate ligand, such as 1,10-phenanthroline, bipyridine or 1,2-bis(dimethylphosphino)ethane or its diphenyl analog;

each $X^2$, independently, is a functional group, such as halogen, CN or $SO_4$;

p is 1 or 2; and m is 0, 1 or 2; or (e) by subjecting any of the catalysts 1(a)–(c), or the catalyst employed by Keim et al., Angew. Chem Int. Ed. Engl., 17, No. 6, 466 (1978), to ethylene oligomerization or polymerization conditions as described, for example, by Keim et al. in the aforesaid publication. After removing the oligomer by distillation, or the polymer by filtration, the crystalline orange catalyst component 3(i) is recovered by partial evaporation of the solvent at or below atmospheric pressure at a temperature of about 20° C. to about 100° C.

The nickel-containing catalyst component 3(i) wherein $X^1$ is S can be prepared by reacting the compound 3(i) wherein X is O with a molar excess of $H_2S$ in an alkanol, such as methanol or ethanol, at a temperature in the range of about $-10°$ C. to about 100° C., preferably about 10° C. to about 40° C., at a pressure of at least one atmosphere; excess $H_2S$ and the alkanol are removed under reduced pressure and the catalyst component can be purified by recrystallization from an alkanol-dichloromethane mixture Alternatively, the nickel-containing catalyst component 3(i) can be prepared from a 3-thioketophosphine of the formula $(R^4)_2PCH(R^5)C(S)R^6$ wherein $R^4$, $R^5$ and $R^6$ are defined as above The amount of catalyst employed in the copolymerization process of this invention is not critical and may vary from about 0.001% to about 50%, by weight, based on the combined weights of catalyst, ethylene and comonomer(s) used. Preferably, the amount of catalyst is about 0.001% to about 15%, by weight.

Known poisons for the catalysts used in the invention process include excessive amounts of oxygen, water, inorganic and organic acids, alkyl halide, strongly binding ligands, such as phosphines or arsines, pyridines, sulfides and aluminum trialkyls (although boron trialkyls are not poisonous). When catalyst poisons are known to be present, scavenger molecules may be added to "neutralize" them. Thus, for example, when water or acids are present, addition of titanium tetraalkoxides, alkyl aluminumdi-(2,6-di-t-butyl-4-methyl)-phenoxide or [(1-methoxy-2-methyl-1-propenyl)oxy]-trimethylsilane will complex or react with the poisons to give inert products. Also, the scavengers can be heterogeneous; for example, molecular sieves which can bind small molecules such as water and inorganic or organic acids or bases.

The catalysts themselves may be supported on a heterogeneous support, such as the newly-formed polymer, anion exchange resins, inorganic hydroxides or oxides, such as calcium hydroxide or silica, or inorganic salts, such as nickel(II) chloride, calcium chloride or magnesium chloride. These supports may immobilize the homogeneous catalysts and thus increase their lifetime.

Ethylene and the comonomer(s) are contacted with a solvent containing the catalyst, or with only the solvent into which the catalyst is later injected at the reaction temperature. The catalyst may also be intermittently or continuously added to the polymerization reactor. Comonomer(s), which may also serve as solvent, may be introduced at any time during the polymerization, at a concentration of about 0.1 to 50%, by weight, of solvent. The amount of comonomer(s) present during polymerization, and the pressure of ethylene employed, determine the amount of comonomer incorporated into the polymer. An increase in ethylene pressure may also increase the molecular weight of the copolymer. Copolymer molecular weight can also be influenced by factors which affect catalyst activity, such as solvent polarity and the presence of ligands, such as triphenylphosphine or amines.

Suitable solvents include non-polar organic solvents, such as linear or branched alkanes and cycloalkanes, such as pentane, isooctane and cyclohexane, and mixtures thereof, as well as aromatic solvents, such as benzene, toluene and xylenes. Polar solvents include ethers, such as diethylether, ethylene glycol dimethyl ether, tetrahydrofuran and dioxane; esters, such as ethyl acetate and methyl benzoate; ketones, such as acetone and methylethylketone; amides, such as formamide and dimethyl acetamide; nitriles, such as acetonitrile and benzonitrile; alcohols, such a methanol, isopropanol, tert-butanol and ethylene glycol; amines, such as tri-n-butylamine and N-methylpyrrolidine; sulfur-containing solvents, such as dimethylsulfoxide and sulfolane; fluorocarbons; triethyl phosphate; nitromethane; and tetraethylsilicate.

Additives, such as 2,6-di-tert-butyl-4-methylphenol and its reaction products with trimethylaluminum, as well as titanium(IV) alkoxides, such as titanium(IV) isopropoxide, can also be included in the polymerization reaction mixture. Such additives serve as stabilizers in the final polymer or to scavenge excess water or small amounts of acids which are deleterious to the catalyst.

The polymerization reaction should be carried out in an oxygen-free atmosphere, such as argon, nitrogen, hydrogen, carbon dioxide or sulfur dioxide.

Copolymerization is carried out in a temperature range of about 0° C. to about 200° C., preferably about 20° C. to about 120° C. Ethylene pressure may vary from about 1 psig (6.9 kPa) to about 10,000 psig (69,000 kPa), preferably about 10 psig (69 kPa) to about 3,000 psig (20,700 kPa). Copolymerization can be carried out in batch, continuous or semi-continuous facilities. The copolymer can be isolated by conventional techniques, such as filtration, centrifugation, solvent evaporation, or by precipitation in a non-solvent, such as methanol Optionally, an acid, such as hydrochloric acid, may be added to the precipitant to help remove spent catalyst from the polymer.

The unreacted comonomer(s) and spent catalyst can be removed from the copolymer by extraction into a solvent in which the copolymer is insoluble Such solvents, which include alcohols, ketones and tertiary amines, should be selected so that they can be easily separated from the comonomer(s) by distillation or extraction. Spent catalyst can be recovered by crystallization or extraction with water, which may contain small amounts of acid.

The copolymers prepared by the process of this invention will usually have molecular weights ($\overline{M}$) in the range of about 1000 to over 100,000. The copolymers are useful in a wide variety of commercial applications, as will be known to those skilled in the art, including, for example, molding resins for producing shaped articles, such as films, membranes and molded objects; polymeric plasticizers; polymeric compatibilizers for normally incompatible polymers, such as polyethylene and nylon; dye-site resins; polymeric binders for glass fibers and minerals; cross-linking agents; ion-exchange materials; adhesives; polymeric reinforcing additives for oils; supports for drug delivery; and waxes and other hydrocarbon products.

In the following examples which are embodiments of the invention, parts are by weight and temperatures are in degrees Celsius unless otherwise indicated. All reactions were conducted in an atmosphere of nitrogen. Immediately following is a description of three different preparations of catalyst component 3(i), any one of which, when mixed with a suitable alkylating or arylating agent, forms catalyst mixture (3) of the invention.

To 7.1 g (18.7 mmol) of (benzoylmethylene)-triphenylphosphorane and 2.6 g (9.5 mmol) of bis(cyclooctadiene)nickel(0) was added 300 mL of toluene and 20 g of methyl methacrylate. After stirring the solution for 19 h at 25°, the solvent was removed under reduced pressure and the recovered solid was recrystalized from a mixture of methylene chloride-ethanol by partially removing the methylene chloride under reduced pressure to give 3.8 g of

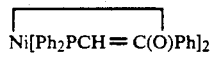

as deep orange crystals. Further reduction of the solvent gave an additional 0.8 g for a combined yield of 75%. The crystals and its solutions are air-stable.

Using a procedure substantially the same as that described above, except that the phosphorane used was [benzoyl(phenyl)methylene]triphenylphosphorane, a 30% yield of

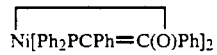

was obtained.

A small pressure bottle was charged with 100 mg 0.15 mmol) of

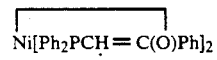

and 10 mL of methanol. After a brief evacuation, the bottle was charged to 80 psig (552 kPa) with hydrogen sulfide. The pressure was released after 5 minutes and the methanol was evaporated. The solid was dissolved in a small amount of methylene chloride; the solution was treated with charcoal and filtered; the charcoal was washed with a small amount of ethanol. On removing part of the solvent 60 mg of honey-colored crystals of

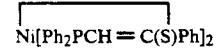

was collected and dried.

EXAMPLE 1

Catalyst Mixture (3) and Catalyst 1(c)

To 1.10 g (1.68 mmol) of

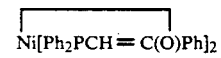

and 75% mL of toluene was added 0.18 g (2.50 mmol) of trimethylaluminum. After a homogeneous honey-brown solution was obtained, 5 mL of ether and 20 mL of hexane were added. On standing,

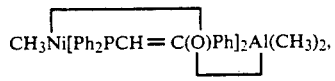

Catalyst 1(c), precipita as an orange solid which was collected and washed with hexane. The yield was 1.1 g (90%).

EXAMPLE 2

Catalyst 1(b)

To 3.20 g (8.42 mmol) of (benzoylmethylene)triphenylphosphorane, 2.31 g (8.42 mmol) of bis(1,5-cyclooctadiene)nickel(0), and 10.8 g of pyridine was added 200 mL of toluene. The mixture was briefly heated to 50°, allowed to cool to 25°, and stirred for 16 h. After the addition of diatomaceous earth filter aid the solution was filtered to remove a small amount of nickel metal. The solvent was removed under reduced pressure. The yellow solid was collected to give, after a hexane wash, 3.8 g of yellow solid

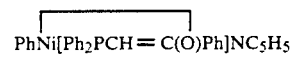

which was purified from warm toluene to which hexane was added.

EXAMPLE 3

Catalyst 1 (b)

The procedure of Example 2 was followed, except that q-picoline was substituted for pyridine and the phorphorane Ph$_2$P=C(SO$_3$Na)C(O)Ph was substituted for (benzoylmethylene)triphenylphosphorane. The product was

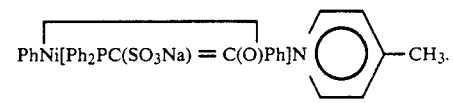

EXAMPLE 4

Catalyst 1(b)

The procedure of Example 2 was followed, except that the phosphorane Ph$_2$P=C(SO$_3$Na)C(O)Ph (4.8 g) was used instead of the (benzoylmethylene)triphenylphosphorane. Yield of

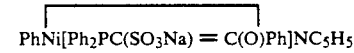

was 4.9 g.

EXAMPLE 5

Catalyst 1(b)

The procedure of Example 2 was followed, except that (benzoylmethylene)(diphenyl)methylphosphorane (3.3 g) was substituted for (benzoylmethylene)triphenylphosphorane. The product was

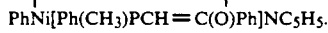

EXAMPLE 6

Catalyst Mixture (2) and Catalyst 1(a)

A freshly-prepared 70 mL-benzene solution of 2.70 g (4.87 mmol) of Catalyst Component 2(i),

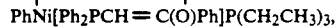

and 0.68 g (2.64 mmol) of acceptor compound 2,4-pentanedionatobis(ethylene)rhodium(I), was promptly filtered to remove a small amount of insolubles. On standing, 0.69 g of honey-brown crystals of [PhNi[Ph$_2$PCH=C(O)Ph]]$_2$, Catalyst 1(a), precipitated; this was collected and washed with a small amount of benzene. After heating the filtrate to 60° and adding 130 mL of benzene and 50 mL of hexane the solution yielded, after 72 h, an additional 0.25 g of crystals, for a combined yield of 44%.

EXAMPLES 7-18

The compounds prepared in these examples are species of catalyst mixture component (2)(i), of formula hereinabove, wherein L$^2$ is P(R$^1$)$_3$, X$^1$ is O and E$^1$ is P. The compounds of Examples 7-13 and 16-18 were prepared by procedures similar to those of Keim et al., supra. The compounds of Examples 14 and 15 were prepared by the procedure described in U.S. Pat. No. 4,293,502. In each case, catalyst mixture (2) of the invention was prepared by mixing an acceptor compound, as described above, with the catalyst components prepared in these Examples 7-18. The symbols represented in the aforesaid formula are tabulated in Table 1.

TABLE 1

| Ex. | R$^3$ | R$^4$ | R$^4$ | R$^5$ | R$^6$ | R$^1$ |
|---|---|---|---|---|---|---|
| 7 | Ph | Ph | Ph | H | Ph | Ph |
| 8 | Ph | Ph | Ph | Ph | OCH$_3$ | CH$_2$CH$_3$ |
| 9 | Ph | Ph | Ph | Ph | Ph | CH$_2$CH$_3$ |
| 10 | p-CF$_3$C$_6$H$_4$ | Ph | Ph | H | Ph | CH$_2$CH$_3$ |
| 11 | Ph | Ph | Ph | Ph | OCH$_3$ | Ph |
| 12 | Ph | Ph | Ph | Ph | OCH$_3$ | CH$_3$ |
| 13 | Ph | Ph | Ph | Ph | Ph | Ph |
| 14 | Ph | Ph | Ph | SO$_3$Na | Ph | Ph |
| 15 | Ph | Ph | Ph | SO$_3$Na | OCH$_3$ | Ph |
| 16 | Ph | Ph | Ph | H | Ph | p-CF$_3$C$_6$H$_4$ |
| 17 | Ph | o-CH$_3$OC$_6$H$_4$ | Ph | H | Ph | Ph |
| 18 | Ph | o-CH$_3$OC$_6$H$_4$ | * | H | Ph | Ph |

*o-CH$_3$OC$_6$H$_4$
Ph = C$_6$H$_5$

EXAMPLE 19

Catalyst 1(b)

The procedure of Example 2 was followed, except that [benzoyl(phenyl)methylene]triphenylphosphorane (5.05 g) was used instead of (benzoyl methylene)triphenylphosphorane. The yield of

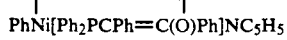

was 5.3 g.

UTILITY

EXAMPLE 20

Copolymerization of Ethylene and Methyl 4-Pentenoate

A 250 mL pressure bottle was charged with 200 mg of catalyst mixture (2) comprised of equal parts of catalyst component 2(i), prepared as in Example 7, and the acceptor compound 2,4-pentanedionatobis(ethylene)rhodium(I), together with 50 mL of toluene and 5 mL of methyl 4-pentenoate (M4P). After attaching a pressure head, the bottle was evacuated and charged to 50 psig (345 kPa) with ethylene. The bottle was partially immersed in a 50° oil bath, stirred magnetically, and repressured periodically to 50 psig (345 kPa) with ethylene. After 135 minutes the pressure was reduced and solvent and unreacted comonomer were removed under reduced pressure to give, after washing with methanol, 1.4 g of a white ethylene copolymer containing 3.6% of M4P.

EXAMPLE 21

Copolymerization of Ethylene and M4P

A 100 mL toluene solution containing catalyst mixture (4) comprised of 1.0 g of bis(1,5-cyclooctadiene)-nickel(0) and 1.54 g of (C$_6$H$_5$)$_3$P=C(CO$_2$CH$_3$ was stirred for 24 h at 25°. The solution was filtered to give a clear red-brown solution. A pressure bottle was charged with 50 mL of this solution and 2 g of M4P. After briefly evacuating, the bottle was charged to 50 psig (345 kPa) with ethylene and placed in a 50° oil bath for 75 minutes. The ethylene was released and solvent and excess comonomer were removed under reduced pressure to give, after a hexane and methanol wash, 3.1 g of a gray polymer. This polymer (2.6 g), 100 mL methanol, and 2 mL of conc. hydrochloric acid were refluxed for 30 minutes. The now white polymer was collected on a filter, washed with methanol, and dried at 25°/0.01 mm Hg for 27 h. The infrared spectrum showed strong ester absorption at 1742 cm$^{-1}$. The polymer softened at 80°-85° and melted at 150°; molecular weight, $\overline{\text{MHD}}$ w, 11,000; dispersity 2.87. Analysis showed it to be an ethylene copolymer containing 6.5% of M4P.

EXAMPLE 22

A procedure similar to that of Example 21 was used, except that 5 mL of 5-hexene-2-one (5H2O) was substituted for the 2 g of M4P. After 195 minutes 2.0 g of polymer was precipitated with methanol. This polymer was redissolved in chlorobenzene, treated with activated charcoal, precipitated with methanol and dried. The infrared spectrum showed a strong carbonyl absorption at 1618 cm$^{-1}$. This ethylene copolymer contained 8.3% of 5H20 and had a of 7,200, with a dispersity of 4.41.

EXAMPLEs 23-39

The following ethylene copolymerization procedure was used in Examples 23-39. A 500 mL pressure bottle was charged under nitrogen with catalyst, cocatalyst, additive(s), comonomer, and solvent as shown in Table 2 (toluene was used as the solvent). A Lab-Crest Scientific multi-ported head and stirrer assembly outfitted with a thermocouple for measuring the reaction temperature, a pressure relief valve, an injection port similar to those found on gas chromatographs, and two valves (one of which was used as a manual vent; the other was connected to an ethylene line which contained an in-line pressure regulator and gauge) were attached. The bottle was pressurized to 60 psig (414 kPa) with ethylene and the contents was stirred at 500 to 1500 rpm. The ethylene valve was closed after 2 minutes and the bottle was partially immersed in a constant-temperature oil bath. The pressure rose initially due to the increase in temperature but fell with the onset of polymerization and was then kept constant at a 60 psig (414 kPa) ethylene pressure. At times the reaction temperature exceeded the bath temperature and when this happened, it was usually controlled with an external cooling bath. The reaction was terminated by releasing the pressure. The contents of the bottle was then transferred to a 1000 mL beaker with about 600 mL of methanol. A small amount of 10 N hydrochloric acid was added and the mixture was stirred until the ethylene copolymer was white. It was collected on a filter, washed with several portions of methanol to remove unreacted monomers, and dried at 25° under reduced pressure. The yields, reaction conditions, and other pertinent data are given in Table 2. The infrared spectra of the isolated polymers showed comonomer incorporation in all cases.

Regarding Example 29, if the ethylvinyl ether were replaced by vinyltriethoxysilane, the polymerization product would be a copolymer of ethylene and vinyltriethoxysilane.

TABLE 2

| Ex. | Catalyst | Wt. mg | Catalyst or Component | Comonomer | g (mL) | Notes | Solvent (mL) | Oil Bath | Max Reaction | Cooling Bath | React. Time Min. | % Comonomer in Copolymer | Yield g |
|---|---|---|---|---|---|---|---|---|---|---|---|---|---|
| 23 | 4(i) 4(ii) | 200 400 | A B | Si(OC$_2$H$_5$)$_3$ | 5 | | 70 | 80 | 88 | No | 90 | 13 | 10.0 |
| 24 | 2(i) 2(ii) | 300 150 | C A | Si(OC$_2$H$_5$)$_3$ | 10.7 | 1 | 250 | 60 | 61 | Yes | 66 | — | 40.0 |
| 25 | 4(i) 4(ii) | 150 400 | A B | Si(CCH$_3$)$_3$ | (6) | 2 | 60 | 80 | 81 | No | 30 | — | 3.4 |
| 26 | 4(i) 4(ii) | 200 400 | A B | C$_4$F$_9$ | 5 | | 60 | 80 | 117 | No | 48 | 17.6 | 19.3 |
| 27 | 4(i) 4(ii) | 200 646 | A B | C(CF$_3$)$_3$ | 14 | 3 | 60 | 104 | 106 | No | 30 | — | 11.5 |
| 28 | 4(i) 4(ii) | 200 400 | A B | OSi(OC$_2$H$_5$)$_3$ | 0.5 (3) | 3 | 60 | 104 | 100 | No | 24 | — | 9.5 |
| 29 | 2(i) 2(ii) | 100 50 | D E | ⌒O⌒ | 5 | | 100 | 65 | 65 | No | 30 | 1.4 | 1.8 |
| 30 | 4(i) 4(ii) | 200 400 | A B | P(O)(OC$_2$H$_5$)$_2$ | 5 | 3 | 60 | 80 | 112 | No | 38 | — | 12.5 |
| 31 | 4(i) 4(ii) | 150 400 | A B | CN | (2.8) | 4 | 60 | 104 | 93 | Yes | 48 | — | 4.7 |
| 32 | 1(b) | 510 | F | (CH$_2$)$_8$—CO$_2$CH$_3$ | 13.0 | | 250 | 90 | 94 | Yes | 120 | 15.6 | 45.0 |
| 33 | 2(i) 2(ii) | 200 50 | C A | (CH$_2$)$_8$—CO$_2$CH$_3$ | 10.0 | 5 | 100 | 25 | 97 | No | 26 | — | 14.1 |
| 34 | 4(i) | 150 | A | (CH$_2$)$_8$C—(O)N(CH$_3$)—CH$_2$CH$_2$—N(CH$_3$)$_2$ | 5.0 | | 60 | 80 | 103 | No | 69 | 12.5 | 20.5 |
| 35 | 2(i) 2(ii) | 200 100 | G E | (CH$_2$)$_9$OH | 15.0 | | 70 | 80 | 75 | No | 50 | — | 3.4 |
| 36 | 2(i) 2(ii) | 200 100 | G A | (CH$_2$)$_9$OH | 11.4 | | 100 | 80 | 96 | No | 32 | 40 | 4.8 |
| 37 | 2(i) 2(ii) | 200 100 | C A | 1-octene | (40) | | 60 | 25 | 61 | Yes | 64 | — | 30 |
| 38 | 4(i) 4(ii) | 150 400 | A B | 1,5-Hexadiene | (9) | 6 | 60 | 105 | 91 | Yes | 67 | — | 17.5 |

TABLE 2-continued

| Ex. | Cat- alyst | Wt. mg | Catalyst or Component | Comonomer | g (mL) | Notes | Sol- vent (mL) | Temperature Oil Bath | Max Reac- tion | Cool- ing Bath | React. Time Min. | % Comon- omer in Copolymer | Yield g |
| --- | --- | --- | --- | --- | --- | --- | --- | --- | --- | --- | --- | --- | --- |
| 39 | 4(i) | 150 | A | 1,9-decadiene | 10 | 7 | 50 | 105 | 126 | No | 34 | — | 18 |

Catalyst or Component
A. Bis(1,5-cyclooctadiene)nickel(0)
B. $(C_6H_5)_3P=C(C_6H_5)C(O)C_6H_5$
C. Example 17
D. Example 11
E. 2,4-Pentanedionatobis(ethylene)rhodium(I)
F. $C_6H_5Ni[(C_6H_5)_2PC(C_6H_5)=C(O)C_6H_5]NC_5H_5$
G. Example 16

Notes
1. Initially, 3 g of comonomer was charged. After 7.5 min, 2.6 g of comonomer was injected. A similar size charge was injected at 8.5 and 9.5 min into the run, that is, 1 min and 2 min after the first injection.
2. The comonomer was injected after 9.5 min.
3. The polymer was precipitated and washed with ethanol.
4. The comonomer was injected as follows: 0.8 mL at 8.5 min and 2.0 mL at 9.25 min.
5. Comonomer was mixed with 1.06 of titanium isopropoxide to remove traces of acid.
6. Comonomer was injected at 8, 17, and 24 min.
7. After 10.25 min, a gel formed.

EXAMPLE 40

A 500 mL pressure bottle was charged with 10.6 g of the trimethylsilyl ester of undecylenic acid and 1.06 g of [(1,2-dimethyl-1-propenyl)oxy]trimethylsilane. After 15 minutes 200 mL of toluene and 250 mg of catalyst mixture (2), prepared as in Example 22, were added. The pressure head described in Examples 25-41 was attached, the solution was saturated with 60 psig (414 kPa) ethylene at 27° with stirring at 500 rpm. The bottle was partially immersed in an 80° oil bath. After 52 minutes very little polymerization had occurred; an additional 250 mg of catalyst was added and the bottle was repressured with 60 psig (414 kPa) of ethylene and reimmersed in the 80° oil bath. After 40 minutes the reaction temperature reached 92°; the bath was removed and replaced with an ambient water bath when the reaction temperature reached 101°. The run was terminated after 2 h, after the reaction temperature dropped to 85°. The ethylene copolymer was precipitated with 300 mL of hexane under nitrogen, allowed to cool, collected on a filter, washed with hexane, and then dried under reduced pressure at 25° for 9 h to give 27.5 g of the ethylene copolymer which showed $—CO_2-Si(CH_3)_3$ absorptions in the infrared spectrum, indicating the presence of the undecylenate comonomer.

EXAMPLE 41

A 500 mL pressure bottle was charged with 9.5 g of the macromonomer $CH_2=CHCH_2C(C_6H_5)_2[CH_2C(CH_3)CO_2CH_3]_{20}H$, ($\overline{MHD}$ w=2370, with a dispersity of 1.02), 100 mL of tetrahydrofuran and catalyst mixture (4) comprised of 400 mg of $(C_6H_5)_3P=C(C_6H_5)_2C(O)C_6H_5$ and 200 mg of bis(1,5-cyclooctadiene)nickel(0). The pressure head described for Examples 24-40 was attached and the solution was saturated with 60 psig (414 kPa) of ethylene for 2 minutes at 24° with stirring at 500 rpm. The bottle was partially immersed in a 106° oil bath. Within 5 minutes the reaction temperature rose to 64° and the pressure to 81.5 psig (562 kPa), and after 8 minutes the temperature was 89° and the pressure was 60 psig (414 kPa). At this point, the valve to a constant 60 psig (414 kPa) ethylene supply was opened and the polymerization was continued with the bottle removed from the oil bath. With only ambient air cooling, the reaction temperature reached 97° after 15 minutes. After 54 minutes the reaction temperature dropped to 46° and the run was terminated by releasing the pressure and pouring the polymer solution into 500 mL of methanol. The polymer was collected, redissolved in 150 mL of hot toluene containing 2 mL of 10 N hydrochloric acid, reprecipitated with 500 mL of methanol, washed with methanol and extracted with ethyl acetate and methylene chloride, in which the macromonomer is soluble, and dried to give 16.0 g of the ethylene copolymer containing 24.8% of the macromonomer. The average molecular weight, $\overline{MHD}$ 2, was found to be 13,900, with a dispersity of 1.93.

EXAMPLE 42

A 500 mL pressure bottle was charged with 100 mg of the catalyst component prepared as in Example 8, 100 mg of the acceptor compound 2,4-pentanedionatobis(ethylene)rhodium(I), 100 mL of toluene and 5.0 g of styrene. A procedure similar to that of Example 20 was followed to give, after 260 minutes, 25.5 g of ethylene copolymer which by infrared analysis showed styrene incorporation. Solvent-extraction of the polymer with methylene chloride, acetone or tetrafluorofuran yielded a waxy material which, except for slight IR intensity changes, was identical to the unextracted polymer. Differential scanning calorimetric analysis showed a sharp endotherm at 118° with a broad shoulder at 50°-110°.

EXAMPLE 43

A 500 mL pressure bottle was charged with catalyst mixture (4) comprised of 400 mg of [benzoyl(phenyl)methylene]triphenylphosphorane and 200 mg of bis(1,5-cyclooctadiene)nickel(0), together with 60 mL of toluene, 10 g of styrene, and 5 g of 4-triethoxysilyl-1-butene. A procedure similar to that used in Examples 23-39 was followed. Using an 80° oil bath, the reaction temperature reached 97°. After 78 minutes, the ethylene copolymer was precipitated in a dry nitrogen atmosphere with 10 mL of hexane and 600 mL of ether and collected. After drying at 0.005 mm Hg, 22° and 18 h, 15.0 g of light grey copolymer was obtained. Its infrared spectrum showed the presence of both comonomers in the polymer.

EXAMPLE 44

A 500 mL pressure bottle was charged with 2.8 g of $(OC)_5CrP(C_6H_5)_2(CH_2)_3CH=CH_2$, 200 mg of catalyst component 2(i), prepared as in Example 14, 100 mg of bis(1,5-cyclooctadiene)nickel(0), and 100 mL of toluene. The procedure used in Examples 25-41 was followed using a 92° oil bath. The reaction temperature reached 83° after 113 minutes, when the run was terminated. The ethylene copolymer was precipitated with methanol, redissolved in toluene, precipitated with methanol and extracted with boiling methylene chloride to give 1.5 g of a light yellow copolymer. The infrared spectrum showed three carbonyl absorptions at 2065(m), 1985(w) and 1936(vs) cm$^{-1}$, of the pentacarbonylchromium moiety, besides the CH vibrations for the polyethylene backbone.

EXAMPLE 45

An ethylene copolymer containing 13 wt % of the methyl ester of undecylenic acid, with an average molecular weight of 5,820 and a dispersity of 2.3 (similar to Examples 32 and 33), was fractionated at 60° by size-exclusion chromatography using uninhibited toluene as the solvent. Various fractions, each representing a narrow distribution of polymer molecular weights, were collected. Each fraction was mixed with dry potassium bromide, solvent was removed under reduced pressure, and the mixture was analyzed by FT-IR spectroscopy. Each fraction absorbed at 1745 cm$^{-1}$, due to the ester moiety, showing unequivocally that the methyl ester of undecylenic acid was incorporated into all polymer molecular weight fractions.

BEST MODE FOR CARRYING OUT THE INVENTION

The best mode presently contemplated for carrying out the invention is demonstrated by all of the Examples.

What is claimed is:

1. The catalyst precursor mixture comprising:
   (i) the nickel compound of the formula

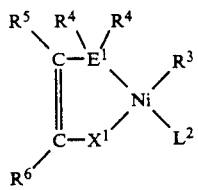

wherein:
R$^3$ and each R$^4$, independently, is H or C$_{1-20}$ hydroalkyl;
X$^1$ is O or S;
E$^1$ is P, As or Sb; and each of R$^5$ and R$^6$, independently, is H, C$_{1-20}$ hydrocarbyl or a functional group selected from —OR$^2$—Cl, —CO$_2$R$^2$, —CO$_2$M, —C(O)N(R$^1$)$_2$, —C(O)R$^2$, —SR$^2$, —SO$_2$R$^2$, OSO$_2$R$^2$, —SOR$^2$, —P(O)(OR$^2$)$_{2-y}$(R$^1$)$_y$, —CN, —NHR$^2$, —N(R$^2$)$_2$,

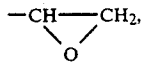

—Si(OR$^1$)$_{3-x}$(R$^1$)$_x$, —OSi(OR$^1$)$_{3-x}$(R$^1$)$_x$, —NO$_2$, —SO$_3$M, —PO$_3$M$_2$ and —P(O)(OR$^2$)$_2$M
wherein M is alkali or alkaline earth metal, ammonium, quaternary ammonium, phosphonium or arsonium, y is 0, 1 or 2, each R$^1$ independently, is H or C$_{1-20}$ hydrocarbyl and x is 0 or an interger of 1 to 3
or R$^5$ and R$^6$, taken together, is a substituted or unsubstituted C$_{5-8}$ alicyclic, C$_{5-8}$ heterocyclic or C$_{6-14}$ aromatic ring, the heteroatom of the heterocyclic ring being selected from O, N and S; asnd L$^2$ is a strongkly coordinating ligand; and
   (ii) an acceptor compound 2. The catalyst precursor mixture comprising
   (i) the nickel compound of the formula

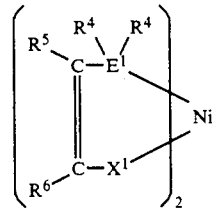

wherein:
R$^4$ is H or C$_{1-20}$ hydrocarbyl;
X$^1$ is O or S;
E$^1$ is P, As or Sb; and
each of R$^5$ and R$^6$, independentl, is H, C$_{1-20}$ hydrocarbyl or a functional group selected from —OR$^2$, Cl, —Co$_2$R$^2$, —CO$_2$M, —C(O)N(R$^1$)$_2$, —C(O)R$^2$, —SR$^2$, —SO$_2$R$^2$, —OSO$_2$R$^2$, —P(O)(OR$^2$)$_{2-y}$(R$^1$)$_y$, —CN, —NHR$^2$, —N(R$^2$)$_2$,

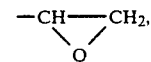

—Si(OR$^1$)$_{3-x}$(R$^1$)$_2$, —OSi(OR$^1$)$_{3-x}$(R$^1$)$_2$, —NO$_2$, —SO$_3$M, —PO$_3$M$_2$ and —P(O)(OR$^2$$_2$M wherein M is alkali or alkaline earth metal, ammonium, quaternary ammonium, phosphonium or arsonium, y is 0, 1 or 2 and R$^1$, each R$^2$, independently, and x are as defined above, or R$^5$ and R$^6$, taken together, is a substituted or unsubstituted C$_{5-8}$ alicyclic, C$_{5-8}$ heterocyclic or C$_{6-14}$ aromatic ring, the heteroatom of the heterocyclic ring being selected from O, N or S;
   (ii) an alkylating or arylating compound.

3. Catalyst precursor mixture of claim 1 wherein R$^3$ is methyl, phenyl or p-trifluoromethylphenyl, each R$^4$ is methyl, phenyl or o-methoxyphenyl, R$^5$ is H, methyl phenyl or —SO$_3$Na, R$^6$ is methyl, phenyl or methoxyl, X$^1$ is O, E$^1$ is P, and L$^2$ is P(R$^1$)$_3$ wherein R$^1$ is methyl, ethyl, phenyl or p-trifluoromethylphenyl.

4. Catalyst mixture of claim 2 wherein each of R$^4$ or R$^5$ is methyl or phenyl asnd R$^6$ is H, methyl or phenyl.

* * * * *

UNITED STATES PATENT AND TRADEMARK OFFICE
CERTIFICATE OF CORRECTION

PATENT NO. : 5,030,606
DATED : JULY 9, 1991
INVENTOR(S) : ULRICH KLABUNDE

It is certified that error appears in the above-identified patent and that said Letters Patent is hereby corrected as shown below:

Col. 1, line 32, replace "cylcoalkyl" with -- cycloalkyl --.

Col. 2, line 4, insert a space between "hydrocarbyl," and "provided".

Col. 3, line 13, replace "is" with -- are --.

Col. 5, lines 16-17, replace "2,4-pentanedionatobis-(ethylene)r-hodium(I)" with -- 2,4-pentanedionatobis(ethylene)rhodium (I) --.

Col. 5, line 54, delete the comma (,) after "solvents".

Col. 6, lines 4, 5, 6, 7, 8, 9, 11 and 12, delete the comma (,) after "compounds", "alcohols", "ethers", "nitriles", "ketones", "amides", "esters", "hydrocarbons", "benzene", and "solvents".

Col. 6, line 30, replace "containin9" with ---containing --.

Col. 6, line 32, replace "descibed" with -- described --.

Col. 6, line 44-45, delete "are mixed in the molar are mixed in the molar".

Col. 7, line 16, insert a period (.) after "mixture".

Col. 7, line 20, insert a period (.) after "above".

UNITED STATES PATENT AND TRADEMARK OFFICE
CERTIFICATE OF CORRECTION

PATENT NO. : 5,030,606
DATED : JULY 9, 1991
INVENTOR(S) : ULRICH KLABUNE

It is certified that error appears in the above-identified patent and that said Letters Patent is hereby corrected as shown below:

Col. 7, line 40, replace ";" with -- , --.

Col. 8, line 2, after "alkanes" insert -- ; --.

Col. 8, line 4, replace "thereof," with -- thereof; --.

Col. 8, line 13, replace "N-methylpyrrolidine" with -- N-methylpyrolidine --.

Col. 8, line 22, delete "to".

Col. 8, line 37, delete the comma (,) after "non-solvent".

Col. 8, line 48, delete the comma (,) after "water".

Col. 8, line 64, insert a comma (,) after "examples".

Col. 9, line 6, replace "was" with -- were --.

Col. 10, line 6, replace "precipita" with -- precipitated --.

Col. 10, line 37, replace "phorphorane" with -- phosphorane --.

Col. 11, line 18, replace "On" with -- On --.

Col. 12, lines 11-12, replace "2,4-pentanedionatobis(ethylene)r-hodium(I)" with -- 2,4-pentanedionatobis(ethylene)rhodium(I) --.

UNITED STATES PATENT AND TRADEMARK OFFICE
CERTIFICATE OF CORRECTION

PATENT NO. : 5,030,606

DATED : JULY 9, 1991

INVENTOR(S) : ULRICH KLABUNE

It is certified that error appears in the above-identified patent and that said Letters Patent is hereby corrected as shown below:

Col. 13, line 5, insert "$\overline{M}_w$" after "and had a".

Col. 13, line 22, replace "was" with -- were --.

Col. 14, line 9, replace "was" with -- were --.

UNITED STATES PATENT AND TRADEMARK OFFICE
CERTIFICATE OF CORRECTION

PATENT NO. : 5,030,606
DATED : JULY 9, 1991
INVENTOR(S) : ULRICH KLABUNE

It is certified that error appears in the above-identified patent and that said Letters Patent is hereby corrected as shown below:

Delete Table 2 bridging columns 13 and 14 and replace with the following:

TABLE 2

| Ex. | Catalyst | Wt. mg | Catalyst or Component | Comonomer | g (mL) | Notes | Solvent (mL) | Oil Bath | Max Reaction Temp | Cooling Bath | React. Time Min. | % Comonomer in Copolymer | Yield g |
|---|---|---|---|---|---|---|---|---|---|---|---|---|---|
| 23 | 4(i) 4(ii) | 200 400 | A B | ~~Si(OC$_2$H$_5$)$_3$ | 5 | | 70 | 80 | 88 | No | 90 | 13 | 10.0 |
| 24 | 2(i) 2(ii) | 300 150 | C A | ~~Si(OC$_2$H$_5$)$_3$ | 10.7 | 1 | 250 | 60 | 61 | Yes | 66 | — | 40.0 |
| 25 | 4(i) 4(ii) | 150 400 | A B | ~~Si(CH$_3$)$_3$ | (6) | 2 | 60 | 80 | 81 | No | 30 | — | 3.4 |
| 26 | 4(i) 4(ii) | 200 400 | A B | ~~C$_4$F$_9$ | 5 | | 60 | 80 | 117 | No | 48 | 17.6 | 19.3 |
| 27 | 4(i) 4(ii) | 200 646 | A B | ~~C(CF$_3$)$_3$ | 14 | 3 | 60 | 104 | 106 | No | 30 | — | 11.5 |
| 28 | 4(i) 4(ii) | 200 400 | A B | ~~OSi(OC$_2$H$_5$)$_3$ | 0.5 (3) | 3 | 60 | 104 | 100 | No | 24 | — | 9.5 |
| 29 | 2(i) 2(ii) | 100 50 | D E | ~~O~~ | 5 | | 100 | 65 | 65 | No | 30 | 1.4 | 1.8 |
| 30 | 4(i) 4(ii) | 200 400 | A B | ~~P(O)(OC$_2$H$_5$)$_2$ | 5 | 3 | 60 | 80 | 112 | No | 38 | — | 12.5 |
| 31 | 4(i) 4(ii) | 150 400 | A B | ~~CN | (2.8) | 4 | 60 | 104 | 93 | Yes | 48 | — | 4.7 |
| 32 | 1(b) | 510 | F | ~~(CH$_2$)$_8$—CO$_2$CH$_3$ | 13.0 | | 250 | 90 | 94 | Yes | 120 | 15.6 | 45.0 |
| 33 | 2(i) 2(ii) | 200 50 | C A | ~~(CH$_2$)$_8$—CO$_2$CH$_3$ | 10.0 | 5 | 100 | 25 | 97 | No | 26 | — | 14.1 |
| 34 | 4(i) | 150 | A | ~~(CH$_2$)$_8$C—(O)N(CH$_3$)—CH$_2$CH$_2$—N(CH$_3$)$_2$ | 5.0 | | 60 | 80 | 103 | No | 69 | 12.5 | 20.5 |
| 35 | 2(i) 2(ii) | 200 100 | G E | ~~(CH$_2$)$_8$OH | 15.0 | | 70 | 80 | 75 | No | 50 | — | 3.4 |
| 36 | 2(i) 2(ii) | 200 100 | G A | ~~(CH$_2$)$_8$OH | 11.4 | | 100 | 80 | 96 | No | 32 | 40 | 4.8 |
| 37 | 2(i) 2(ii) | 200 100 | C A | 1-octene | (40) | | 60 | 25 | 61 | Yes | 64 | — | 30 |
| 38 | 4(i) 4(ii) | 150 400 | A B | 1,5-Hexadiene | (9) | 6 | 60 | 105 | 91 | Yes | 67 | — | 17.5 |

UNITED STATES PATENT AND TRADEMARK OFFICE
CERTIFICATE OF CORRECTION

PATENT NO. : 5,030,606

DATED : JULY 9, 1991

INVENTOR(S) : ULRICH KLABUNE

It is certified that error appears in the above-identified patent and that said Letters Patent is hereby corrected as shown below:

Col. 15, line 38, delete the comma "," after "h".

Col. 16, line 41, delete the hyphen "-" between "Solvent" and "extraction".

Col. 17, line 4, delete the comma "," after "minutes".

Col. 17, line 28-29, insert a begin paren "(" before "due" and a close paren ")" after "moiety".

Col. 18, line 11, replace "interger" with -- integer --.

Col. 18, line 16, replace "asnd" with -- and --.

Col. 18, line 17, replace "strongkly" with -- strongly --.

Col. 18, line 36, replace "independentl" with -- independently --.

Col. 18, line 61, replace "asnd" with -- and --.

Signed and Sealed this

Sixth Day of December, 1994

Attest:

BRUCE LEHMAN

*Attesting Officer*   Commissioner of Patents and Trademarks